US009229785B2

(12) United States Patent
Cai et al.

(10) Patent No.: US 9,229,785 B2
(45) Date of Patent: Jan. 5, 2016

(54) POLICY-BASED WORKLOAD PERFORMANCE OPTIMIZATION FOR DYNAMICALLY DISTRIBUTED OSGI APPLICATION

(71) Applicant: International Business Machines Corporation, Armonk, NY (US)

(72) Inventors: Min Cai, Shanghai (CN); Andrew G. Hourselt, Seattle, WA (US); Ping Li, Shanghai (CN); Hui Yang, Shanghai (CN); Jia M. Zhang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 36 days.

(21) Appl. No.: 14/192,900

(22) Filed: Feb. 28, 2014

(65) Prior Publication Data
US 2014/0298332 A1   Oct. 2, 2014

(30) Foreign Application Priority Data
Mar. 29, 2013   (CN) .......................... 2013 1 0106657

(51) Int. Cl.
*G06F 9/455*   (2006.01)
*G06F 9/50*   (2006.01)
(52) U.S. Cl.
CPC .................................. *G06F 9/5088* (2013.01)
(58) Field of Classification Search
None
See application file for complete search history.

(56) References Cited

U.S. PATENT DOCUMENTS

| | | | |
|---|---|---|---|
| 7,712,100 B2 | 5/2010 | Fellenstein et al. | |
| 2005/0193119 A1* | 9/2005 | Hayes, Jr. | 709/227 |
| 2005/0210474 A1* | 9/2005 | Hayes, Jr. | 719/310 |
| 2009/0313615 A1 | 12/2009 | Joshi et al. | |
| 2010/0191845 A1* | 7/2010 | Ginzton | 709/224 |
| 2011/0185064 A1 | 7/2011 | Head et al. | |
| 2012/0023492 A1 | 1/2012 | Govindan et al. | |
| 2012/0110164 A1 | 5/2012 | Frey et al. | |
| 2012/0131173 A1* | 5/2012 | Ferris et al. | 709/224 |
| 2013/0326507 A1* | 12/2013 | McGrath et al. | 718/1 |

OTHER PUBLICATIONS

Vu Duc Lam; Design and Implementation of concepts for supporting component migration based on OSGI; Nov. 1, 2006-Apr. 30, 2007.*
Tuukka Miettinen; Resource monitoring and visualization of OSGi-based software components; 2008; VTT Publications 685.*
Cassier et al., "System Programmer's Guide to: Workload Manager", ibm.com/redbooks, pp. 1-348, Fourth edition (Mar. 2008).
IBM, "IBM Workload Manager for z/OS The Power of Orchestration", http://www-03.ibm.com/systems/z/os/zos/features/wlm/index.html, pp. 1-2, Accessed on Feb. 27, 2014.
Chinese Patent Application No. 201310106657.1, filed Mar. 29, 2013, entitled: "Method and System for Scheduling Execution of an Application", pp. 1-31.

* cited by examiner

*Primary Examiner* — Dong Kim
(74) *Attorney, Agent, or Firm* — Feb R. Cabrasawan; Arnold B. Bangali

(57) ABSTRACT

A method for scheduling execution of an application is provided. The method comprises monitoring a usage state of resources of a first virtual machine that executes the application, so as to determine whether the usage state reaches a predetermined state. The method further comprises migrating an application module consuming the resources to a second virtual machine having corresponding resources, if the usage state reaches a predetermined state.

12 Claims, 8 Drawing Sheets

POLICY-BASED WORKLOAD PERFORMANCE OPTIMIZATION FOR DYNAMICALLY DISTRIBUTED OSGI APPLICATION

CROSS REFERENCE

The present application claims the benefit of priority of Chinese Patent Application Serial Number 201310106657.1, titled "POLICY-BASED WORKLOAD PERFORMANCE OPTIMIZATION FOR DYNAMICALLY DISTRIBUTED OSGI APPLICATION" filed Mar. 29, 2013 with the State Intellectual Property Office (SIPO) of the People's Republic of China, the contents of which are herein incorporated by reference in its entirety.

FIELD OF THE INVENTION

The present invention relates generally to virtual computing systems, and more specifically, to a method and system for scheduling execution of an application including a plurality of modules.

BACKGROUND

An Open Software Gateway initiative (OSGi) technique, a core of which is an OSGi framework, has been developed in a computer field. The OSGi framework is a modular system and service platform for a Java programming language, which is installed on an Operating System (OS) and realizes a complete and dynamic component model. The OSGi framework has been widely used for establishing infrastructures for enterprise-level applications because of its advantages of being easy to be reused, low development complexity, and so on.

A plurality of virtual machines, which form a cluster (or called workload), can be deployed on the OSGi framework. An OSGi application may be installed and executed on each of the virtual machines. The OSGi application comprises one or more modules. Generally, an entire OSGi application is deployed on one virtual machine, and when the application is executed, respective modules of the application consume resources of the virtual machine, e.g. CPU resources, memory resources, disk resources, network resources and the like, so as to perform corresponding functions.

With the development of the OSGi application (especially the enterprise-level application), there are more and more modules in the OSGi application, such that a size of the OSGi application becomes larger. The OSGi application with an over-large size not only has problems of starting and running slowly, having unstable runtime, having difficulty in finding errors and in deployment, and the like, but also may consume resources of the virtual machine executing the application significantly, so that the virtual machine is exhausted. At the same time, although other virtual machines in the cluster to which the virtual machine belongs have a lot of available resources, the available resources are in an idle state because these virtual machines do not execute applications. This renders that workloads of the respective virtual machines are unbalanced.

SUMMARY

In one embodiment, a method for scheduling execution of an application is provided. The method comprises monitoring a usage state of resources of a first virtual machine that executes the application, so as to determine whether the usage state reaches a predetermined state. The method further comprises migrating an application module consuming the resources to a second virtual machine having corresponding resources, if the usage state reaches a predetermined state.

In another embodiment, a computer system for scheduling execution of an application is provided. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instruction to monitor a usage state of resources of a first virtual machine that executes the application, so as to determine whether the usage state reaches a predetermined state. The computer system further comprises program instructions to migrate an application module consuming the resources to a second virtual machine having corresponding resources, if the usage state reaches a predetermined state.

In yet another embodiment, a computer program product for scheduling execution of an application is provided. The computer program product comprises one or more computer-readable tangible storage devices and program instructions stored on at least one of the one or more storage devices. The computer program product further comprises program instruction to monitor a usage state of resources of a first virtual machine that executes the application, so as to determine whether the usage state reaches a predetermined state. The computer program product further comprises program instructions to migrate an application module consuming the resources to a second virtual machine having corresponding resources, if the usage state reaches a predetermined state.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refer to the same components in the embodiments of the present disclosure.

DETAILED DESCRIPTION

Figure 1:
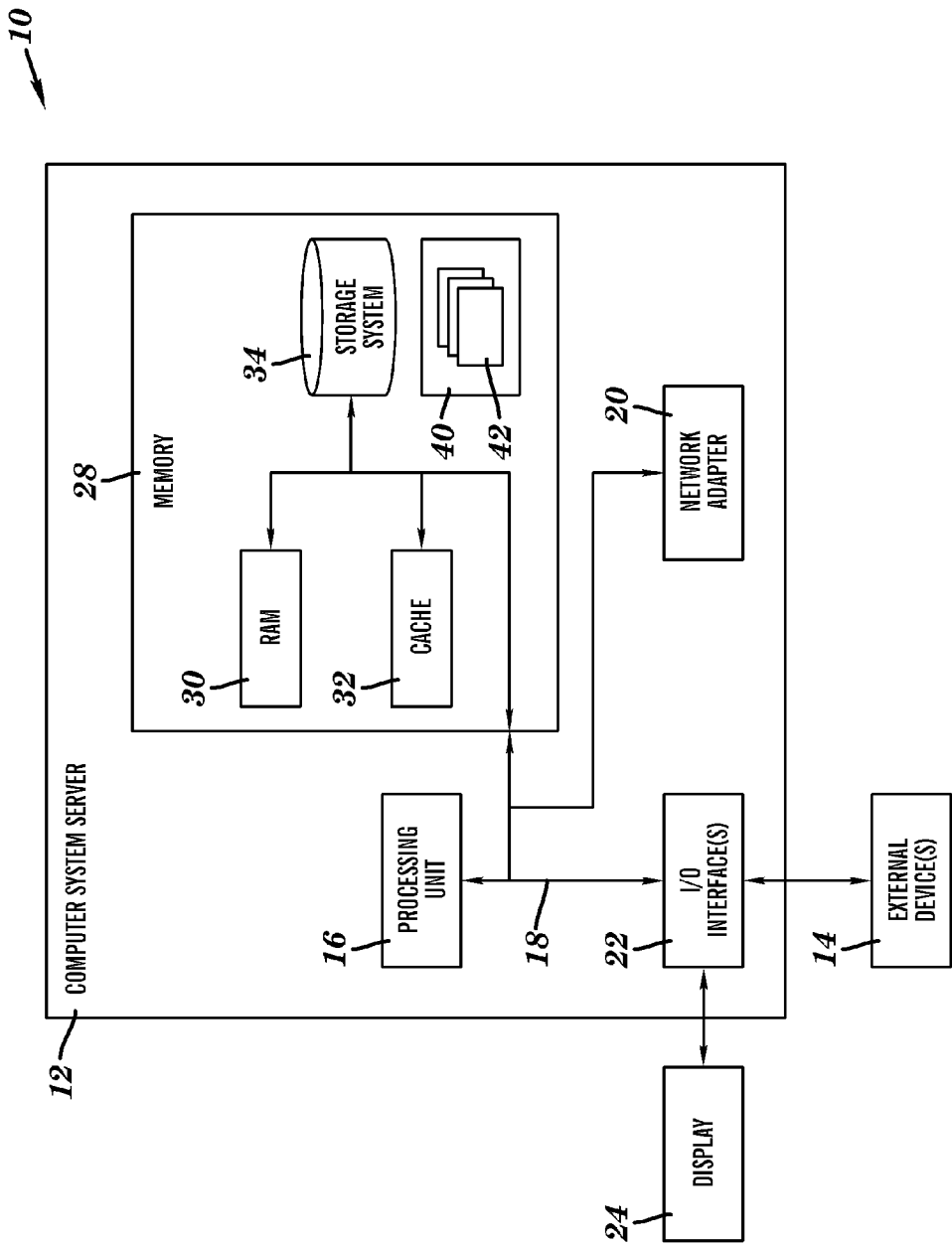
FIG. 1 shows a block diagram of an exemplary computer system/server 12 which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 of computing environment 10, wherein computer system/server 12 is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc. A method and system for scheduling execution of an application including a plurality of modules according to embodiments of the present invention will be described below with reference to drawings.

Figure 2:
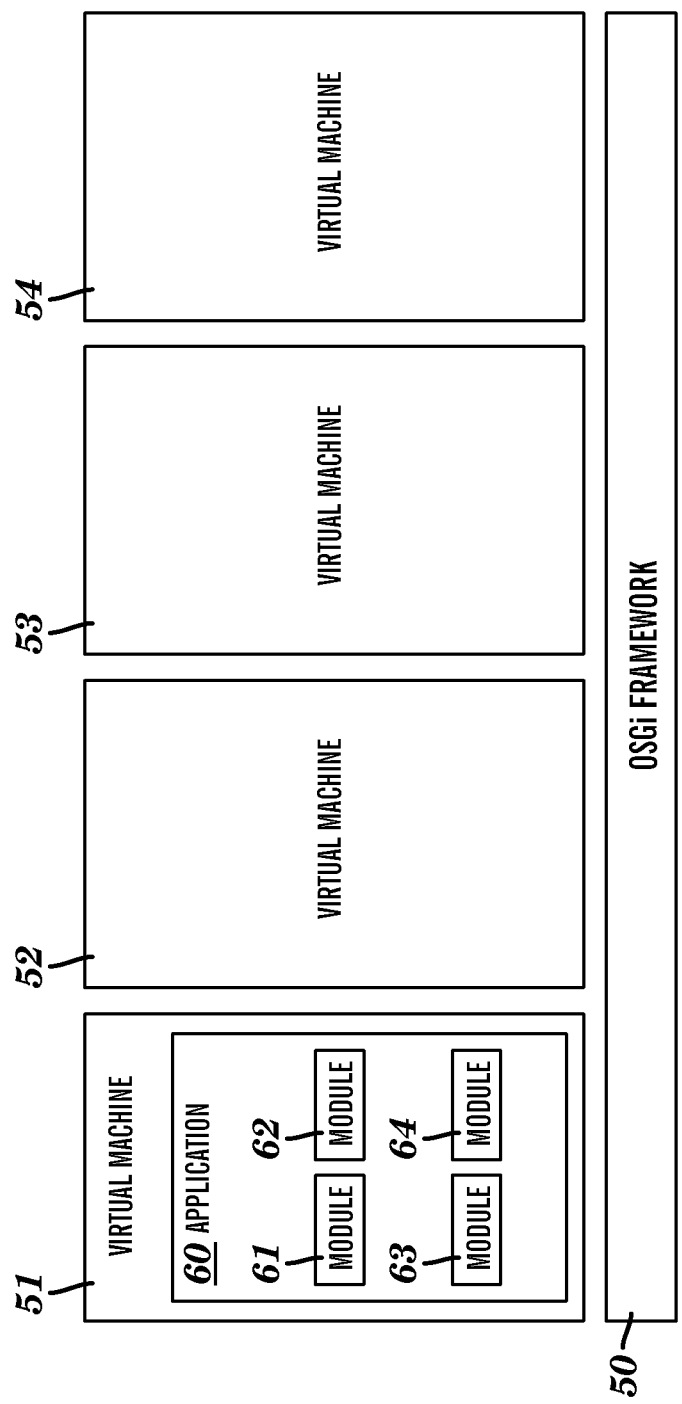
FIG. 2 shows an exemplary environment in which embodiments of the present invention may be applied.

FIG. 2 shows an exemplary environment in which the embodiments of the present invention may be applied. As shown in FIG. 2, one or more virtual machines may be deployed on an OSGi framework 50 installed in an Operating System (OS, not shown). In FIG. 2, only four virtual machines 51-54 are shown for simplicity. As described above, each of the virtual machines may have a CPU, a memory(s) and a virtual disk(s), and an OSGi application which may comprise one or more modules may be installed and executed in each of the virtual machines. As an example, in FIG. 2, an OSGi application 60 is installed in a virtual machine 51 (that is, a first virtual machine), and the application 60 comprises four modules 61-64. It is to be appreciated that the numbers of the virtual machines, the OSGi application(s) and the modules therein may be more or less than the numbers shown in FIG. 2.

When the application 60 is executed in the virtual machine 51, the application 60 (specifically, the modules 61-64) uses various resources in the virtual machine 51 to perform corresponding functions. Hereinafter, CPU resources (computing resources), memory resources and disk resources are taken as examples of the resources in the virtual machine for convenience of description. In the example shown in FIG. 2, it is assumed that the various resources in the virtual machines 51-54 are as shown in Table 1 below.

TABLE 1

| Virtual Machine | Architecture | Number of CPU | Size of Memory | Size of Disk |
|---|---|---|---|---|
| 51 | x86_kvm | 4 | 6 GB | 72 GB |
| 52 | x86_kvm | 2 | 2 GB | 640 GB |
| 53 | x86_kvm | 8 | 4 GB | 36 GB |
| 54 | P_phyp | 4 | 32 GB | 72 GB |

At least one of the respective modules in the OSGi application executed on the virtual machine 51 may be configured with a resource label in advance. In an embodiment, the resource label may indicate one or more types of resources to be consumed by the module when the module is executed. For example, if the module of the application would consume the CPU resources and/or the memory resources when it is executed, the module may be configured in advance with the resource label indicating that the module would consume the CPU resources and/or the memory resources when it is performed. In another embodiment, the resource label may indicate resources mainly consumed by the module among various resources of the virtual machine. Particularly, the module of the application may consume several types of resources when it is executed, but amounts of these resources that it consumes may be not always equal to each other. In this case, the resource label may indicate one or more types of resources consumed greatly by the module. For example, if the module would consume many memory resources and a little CPU resources when it is executed, that is, the module would mainly consume the memory resources, the module may be configured in advance with the resource label indicating that the module would mainly consume the memory resources when it is executed.

As a manner for configuring resource labels to the respective modules of the application in advance, the resource labels may be added to the respective modules of the application by a developer when he writes the application. It is also possible to determine the resources to be consumed or mainly consumed by the respective modules by analyzing source codes of the application before the application is executed, and add corresponding resource labels.

Furthermore, a resource label may be added to a module in many ways. In an implementation, a field indicating resources to be consumed or mainly consumed by the module when it is executed may be added into a configuration file of the module, as the resource label. For example, if the module would consume or mainly consume CPU resources, a field indicating "CPU" may be added into the configuration file of the module. If the module would consume or mainly consume memory resources, a field indicating "MEMORY" may be added into the configuration file of the module. If the module would consume or mainly consume disk resources, a field indicating "DISK" may be added into the configuration file of the module.

In another implementation, corresponding fields may be set in the configuration file of the module for respective types of resources of the virtual machine, and the respective fields are given different values to indicate whether the module would consume or mainly consume the resources corresponding to the fields when it is executed. For example, if the module would consume or mainly consume the resources corresponding to the field when it is executed, a value of 1 may be given to the field as the resource label; otherwise, a value of 0 may be given to the field. In the example shown in FIG. 2, it is assumed that the module 61 mainly consumes the CPU resources and the memory resources, the module 62 mainly consumes the CPU resources, the module 63 mainly consumes the memory resources and the disk resources, and the module 64 mainly consumes the disk resources, and that corresponding fields "CPU-ConsumptionIndex", "Memory-ConsumptionIndex" and "DISK-ConsumptionIndex" are set for the CPU resources, the memory resources and the disk resources of the virtual machine in the configuration files "Manifest.mf" of the respective modules, then the values of the respective fields set in the configuration files of the modules 61-64 are as shown in Table 2 below.

TABLE 2

| Module | Description | CPU-Consumption Index | Memory-Consumption Index | Disk-Consumption Index |
|---|---|---|---|---|
| 61 | Consuming CPU resources and memory resources mainly | 1 | 1 | 0 |
| 62 | Consuming CPU resources mainly | 1 | 0 | 0 |
| 63 | Consuming memory resources mainly | 0 | 1 | 1 |
| 64 | Consuming disk resources mainly | 0 | 0 | 1 |

In this case, related part in the configuration file "Manifest.mf" of the module 61 is shown in code segment 1 below, for example.

Code segment 1]
Manifest-Version: 1.0
Module-ManifestVersion: 2
Module-Name: System Plug-in
CPU-ConsumptionIndex: 1
Memory-ConsumptionIndex: 1
Disk-ConsumptionIndex: 0

Figure 3:
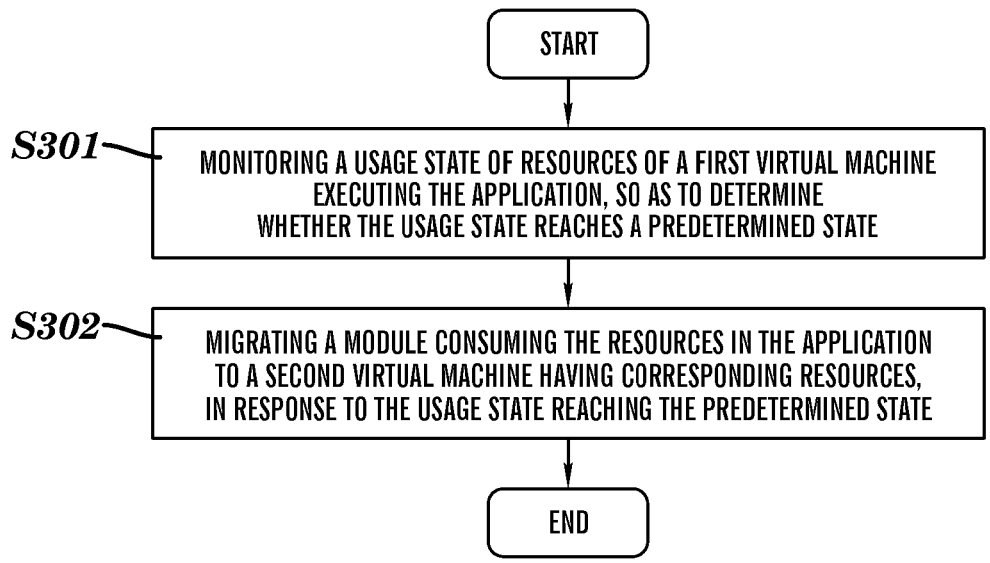
FIG. 3 is a flowchart illustrating a method for scheduling execution of an application including a plurality of modules according to an embodiment of the present invention.

A method for scheduling execution of an application including a plurality of modules according to an embodiment of the present invention is described in detail below with reference to FIG. 3 in conjunction with the example shown in FIG. 2. As shown in FIG. 3, in step S301, a usage state of resources of a first virtual machine executing the application is monitored, so as to determine whether the usage state reaches a predetermined state. In the example shown in FIG. 2, the first virtual machine is the virtual machine 51. As described above, respective modules of the application consume resources of the virtual machine 51 when the application is executed on the virtual machine 51. As the execution of the application, one or more types of resources of the virtual machine 51 may be consumed significantly and even be going to be exhausted. In the embodiment, a state where the resources are consumed significantly or are going to exhausted may be used as the predetermined state, therefore in step S301, the usage state of the resources of the virtual machine 51 is monitored so as to determine whether the resources are consumed significantly or are going to be exhausted. In another embodiment, the predetermined state may be any other state selected depending on design requirements, such as a state where the resources are not used significantly.

The usage state of the resources may be represented by a utilization rate thereof, and in this case, the predetermined state may be a state where the utilization rate of the resources exceeds a utilization rate threshold. The utilization rate threshold may be set flexibly depending on actual requirements. For example, the utilization rate threshold may be set to 90%, so that it is determined that the resources are consumed significantly or are going to be exhausted, that is, the usage state of the resources reaches the predetermined state, when the utilization rate of the resources reaches or exceeds 90%. In the example shown in FIG. 2, assuming that the utilization rate of the disk resources of the virtual machine 51 is found to exceed the utilization rate threshold by the monitoring operation, thus it is determined that the usage state of the disk resources reaches the predetermined state. Besides the utilization rate, other indexes may be used to indicate the usage state of the resources. For example, the usage state of the resources may be represented by its usage amount, and in this case, the predetermined state is a state where the usage amount of the resources exceeds a usage amount threshold. For example, the usage state of the disk resources reaches the predetermined state when the usage amount of the disk resources exceeds a usage amount threshold of "200 GB".

All resources or one or more of the all resources of the virtual machine may be monitored, and it may be determined whether the usage state of any of the resources reaches the predetermined state. In existing Operating Systems, program components capable of monitoring usage states (for example, utilization rates, usage amounts, etc) of various resources of a computer (virtual machine) have been provided, and may be used to perform the monitoring operation in step S301.

Returning to FIG. 3, in step S302, a module consuming the resources in the application is migrated to a second virtual machine having corresponding resources, in response to the usage state of the resources reaching the predetermined state. As described above, the "corresponding resources" that the second virtual machine has here refer to resources which are a same type as the resources of the first virtual machine.

As described above, when the usage state of the resources reaches the predetermined state, a workload of the first virtual machine is heavy, and thus needs to be reduced. In the embodiment of the present invention, the module consuming the resources may be found from a plurality of modules of the application, and then migrated to the second virtual machine, so that the module is executed on the second virtual machine instead of the first virtual machine. Thus, a part of the workload of the first virtual machine is transferred to the second virtual machine, which realizes a balance of the workloads between the two virtual machines.

Detailed operations of the migrating step S302 will be described with reference to FIG. 4.

Figure 4:
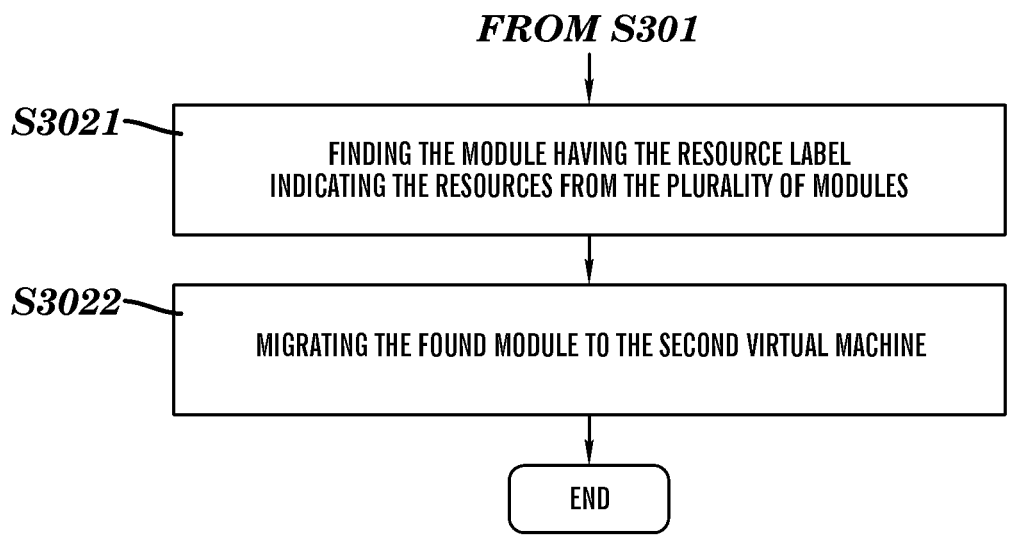
FIG. 4 is a flowchart illustrating detailed operations of step S302 shown in FIG. 3.

As shown in FIG. 4, in step S3021, the module consuming the resources in the application executed on the first virtual machine is found as the module to be migrated, in response to the usage state of the resources reaching the predetermined state. Specifically, since the respective modules in the application are configured with the resource labels described above in advance, the module having the resource label indicating the resources may be found from the respective modules, as the module to be migrated. The resource labels of the modules may be found by searching the configuration files of the respective modules. It is to be noted that, when there are a plurality of modules consuming the resources in the application, a part or all of these modules may be used as the modules to be migrated, or one of these modules (for example, the module which consumes the resources most) may be used as the module to be migrated. In the example shown in FIG. 2, in response to the usage state of the disk resources reaching the predetermined state, a configuration file having a resource label of "Disk-ConsumptionIndex=1" is searched for in the configuration files of the modules 61-64, so that the modules 63 and 64 are found, then one module (e.g. module 64) is selected from the two modules as the module to be migrated according to a criterion predetermined by a user or a developer.

Next, in step S3022, the found module is migrated to the second virtual machine having the corresponding resource. The second virtual machine having the corresponding resources may be a virtual machine having the most corresponding resources, which is selected from the plurality of virtual machines. For example, a virtual machine having the corresponding resources may be selected from the plurality of virtual machines which have existed, as the second virtual machine, i.e. a migration destination. The second virtual machine may be selected in many manners. For example, when one or more of the plurality of virtual machines have the corresponding resources, any one of the virtual machines may be selected as the second virtual machine, and preferably the virtual machine having the most corresponding resources is selected as the second resource. In the example shown in FIG. 2, when the usage state of the disk resources reaches the predetermined state, the virtual machine 52 is selected as the second virtual machine because it has the most disk resources (640 G). Alternatively, the second virtual machine having the corresponding resources may be a virtual machine having the corresponding resources, which is newly generated in response to the usage state of the resources reaching the predetermined state. Particularly, when it is determined that the usage state of the resources of the first virtual machine reaches the predetermined state in step S301, a virtual machine having the corresponding resources may be generated newly, and deployed on the OSGi framework 50 as a new member of the cluster. The method for generating the virtual machine is well known in the art, thus a detailed description thereof is omitted herein.

Figure 5:
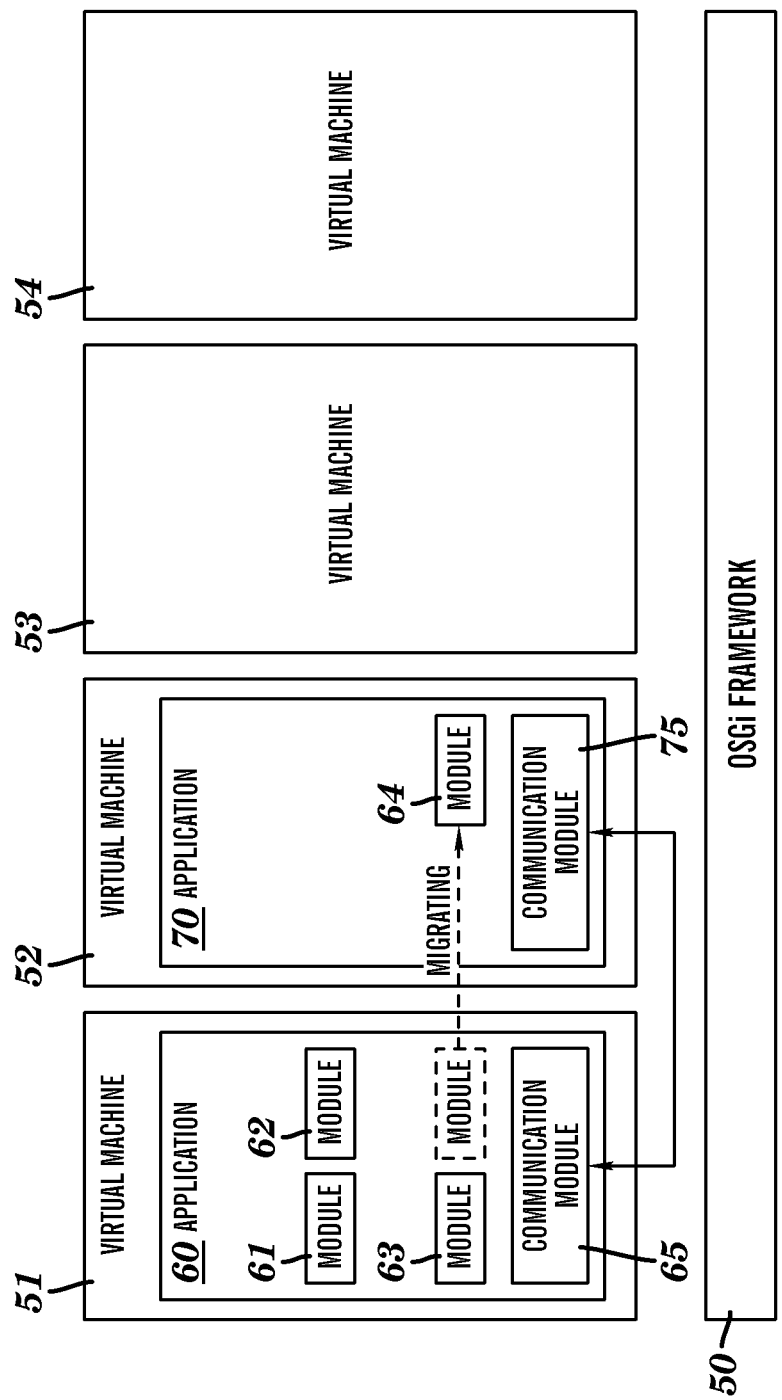
FIG. 5 is a schematic diagram illustrating an example where a module of an application is migrated according to a usage state of disk resources of a virtual machine.

The found module may be migrated onto the second virtual machine by various software/module migration methods well known in the art. For example, firstly, a new application is generated on the second virtual machine by copying an infrastructure of the OSGi application executed on the first virtual machine to the second virtual machine, the infrastructure including, for example, various system modules required for starting the application and the like. Then, the module to be migrated is analyzed to determine dependent items in the application which are required for running of the module, such as other associated modules supporting the running of the module, related configuration information, and the like. Finally, the module is migrated to the second virtual machine together with the respective dependent items (if any), as the module in the application generated on the second virtual machine. In the example shown in FIG. 2, the module 64 may be migrated to the virtual machine 52 which is the second virtual machine. FIG. 5 schematically shows a state after the module 64 is migrated, wherein applications 70, 80, 90, including the migrated module 64, 62, 63, respectively, and dependent items of the module (not shown) is newly generated on the virtual machine 52, 53, 54, respectively.

Through the above migrating operation, a stand-alone application originally executed on one virtual machine may be converted into distributed applications executed on different virtual machines. It is to be noted that, before the above migrating operation is performed, the respective modules of the application executed on the first virtual machine communicate with other modules as required to exchange information such as data and commands. After the above migrating operation is performed, the communication among these modules should be maintained so as to ensure that the respective modules distributed on the first and the second virtual machines can run normally. The communication between the remaining modules of the application executed on the first virtual machine and the modules migrated to the second virtual machine may be maintained in many manners. In an implementation, after the migrating operation is completed, the respective modules on the first virtual machine may be informed of address information of the modules migrated to the second virtual machine, so that the respective modules on the first virtual machine may find the modules on the second virtual machine according to the address information and communicate with them; on the other hand, address information of the respective modules on the first virtual machine may be added into the configuration files of the modules migrated to the second virtual machine, so that the modules migrated to the second virtual machine may find the respective modules on the first virtual machine according to the address information and communicate with them. In another implementation, a first communication module and a second communication module may be created on the first virtual machine and the second virtual machine, respectively, so that the modules of the application executed on the first virtual machine and the modules migrated to the second virtual machine may communicate with each other through the first communication module and the second communication module. Existing module creation tools may be used to create the communication modules, and a description thereof is omitted herein. In such implementation, it is not necessary to modify codes of the respective modules, and the modules of the application executed on the first virtual machine and the modules migrated to the second virtual machine may communicate with each other seamlessly as in the stand-alone application without performing the migrating operation. This implementation will be described in connection with the example shown in FIG. 2.

In the example shown in FIG. 2, the first communication module 65 and the second communication module 75, third communication module 85, and forth communication module 95, which are included in the applications 60, 70, 80, and 90, respectively, are created on the first virtual machine 51 and the second virtual machine 52, respectively, and the modules 61-63 and the module 64 communicate with each other through the two communication modules. The first communication module 65 and the second communication module 75 located on different virtual machines may follow an existing OSGi remote service specification to communicate with each other. The OSGi remote service specification defines two mature schemes, that is, a R-OSGi (Remote-OSGi) scheme and a D-OSGi (Distributed-OSGi) scheme, and any one of the two schemes may be used to perform the communication.

An exemplary method for the first communication module 65 and the second communication module 75 to implement the communication between the modules by using the R-OSGi scheme will be described below. There are two implementations for the R-OSGi scheme, that is, a "register service" implementation and a "package exporting" implementation. Since these two implementations are well known in the art, only brief descriptions thereof are given herein.

Figure 6:
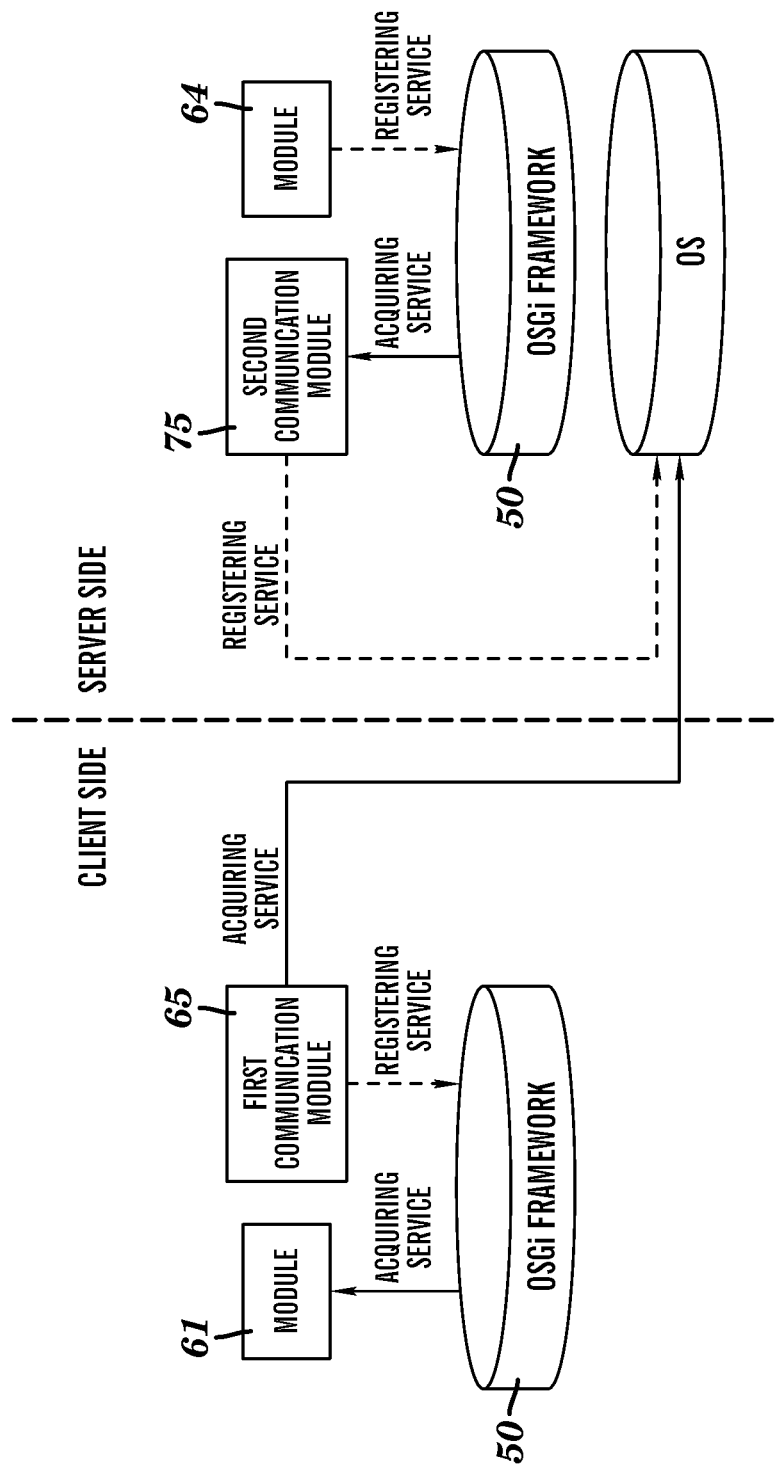
FIG. 6 is a schematic diagram illustrating a process for implementing communication among modules of applications distributed on different virtual machines through "service registering".

FIG. 6 schematically shows a process for implementing communication among the modules of the applications distributed on different virtual machines through the "service registering" R-OSGi scheme. For simplicity, those parts having nothing to do with the communication process are not shown in FIG. 6. Furthermore, it is assumed that the scenario to which FIG. 6 is directed at is a scenario where the module 61 of the application 60 executed on the first virtual machine 51 needs to access the module 64 of the application 70 executed on the second virtual machine, and in this case, the module 61 and the first communication module 65 function as the modules at a client side, while the module 64 and the second communication module 75 functions as the modules at a server side. Moreover, for convenience of illustration, the OSGi framework 50 is shown as two parts in FIG. 6, although the two parts may actually be a whole in the context of the present invention.

As shown in FIG. 6, the module 64 registers a service which it can provide for other modules with the OSGi framework 50 at the server side. Then, the second communication module 75 acquires the service from the OSGi framework 50, and registers the service with the operating system (OS). For example, the second communication module 75 may register the service with a 9278 port of the operation system. At the client side, when the module 61 needs to access the module 64, the first communication module 65 calls the 9278 port of the operating system so as to acquire the service that the module 64 can provide, and then registers the service with the OSGi framework 50. Subsequently, the module 61 may take out from the OSGi framework 50 the service registered with the OSGi framework 50 by the first communication module 65, so that it may acquire and use the service provided by the module 64. Thus, the module 61 and the module 64 may communicate with each other simply by accessing the OSGi framework 50, and they even can be unaware of the presence of the first communication module and the second communication module.

Figure 7:
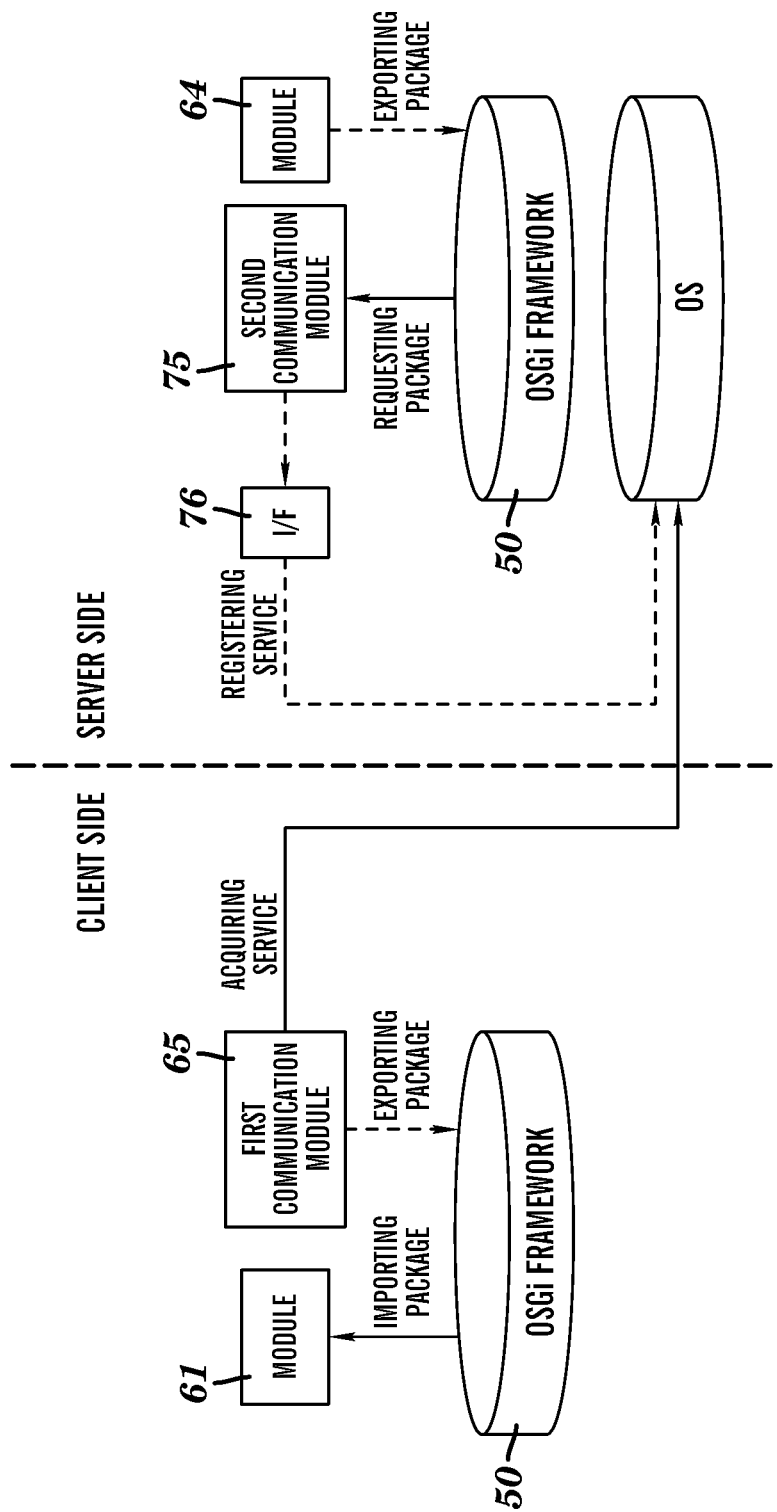
FIG. 7 is a schematic diagram illustrating a process for implementing communication among modules of applications distributed on different virtual machines through "package exporting".

FIG. 7 schematically shows a process for implementing communication among the modules of the applications distributed on different virtual machines through the "package exporting" R-OSGi scheme. The scenario to which FIG. 7 is directed is the same as FIG. 6. Likewise, those parts having nothing to do with the communication process are not shown in FIG. 7.

As shown in FIG. 7, the module 64 exports its source codes (including various classes defined and the like) as a package to the OSGi framework 50 at the server side. The second communication module 75 detects and imports the package exported by the module 64 in the OSGi framework 50. Then, the second communication module 75 generates an interface (I/F) 76 for accessing the imported package, which is registered with the operating system (OS) as a service. For example, the interface 76 may be registered with the 9278 port of the operating system. At the client side, when the module 61 needs to access the module 64, the first communication module 65 calls the 9278 port of the operating system so as to acquire via the interface 76 the service (package) provided by the module 64, and exports the package to the OSGi framework 50. Subsequently, the module 61 imports the package from the OSGi framework 50, thereby acquiring and using the service provided by the module 64. Thus, the module 61 and the module 64 may communicate with each other through the first communication module and the second communication module.

The communication process for the module 61 to access the module 64 has been described above. It is to be appreciated that a substantially same communication process may be performed when the module 64 accesses the module 61, and at this time, what is needed to do is only making the module 61 and the first communication module 65 serve as the modules at the server side and making the module 64 and the second communication module 75 serve as the modules at the client side.

Figure 8:
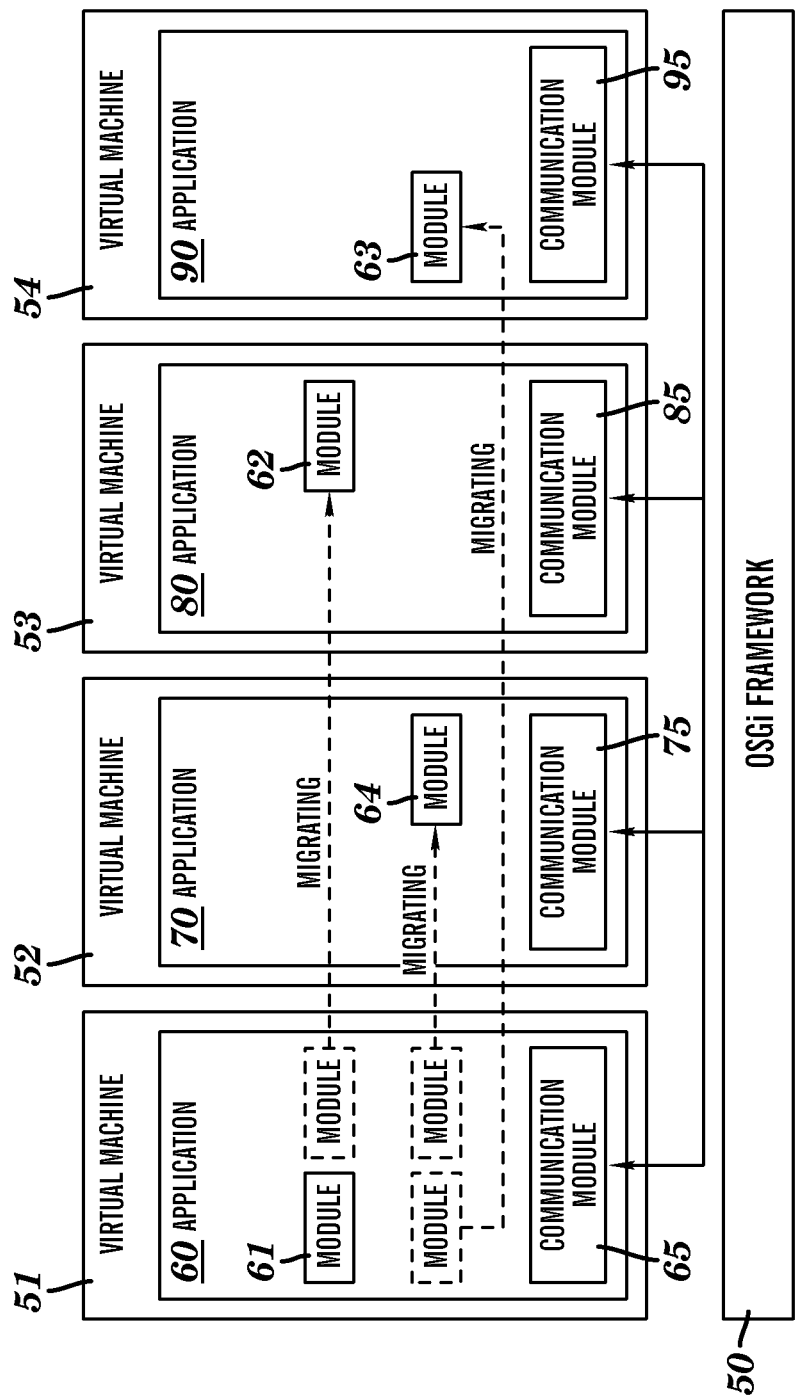
FIG. 8 shows an example where respective modules shown in FIG. 2 are migrated to different virtual machines.

With the above communication method, especially the method for creating the first communication module and the second communication module on the first virtual machine and the second virtual machine respectively to maintain the communication among the modules, the respective modules of the application executed on the first virtual machine and the modules migrated to the second virtual machine may communicate with each other seamlessly in a manner used before the migration, and they even do not need to know the change in the architecture caused by the migrating operation. Thus, even if the modules in the application executed on the first virtual machine are migrated to the second virtual machine, normal execution of these modules would not be affected. During the execution of the application on the first virtual machine, the usage states of various resources of the first virtual machine may be monitored continuously, and the migrating operation described above may be performed when necessary, so that the execution of the application may be scheduled dynamically, and thus the workload of the first virtual machine may be reduced. In the example shown in FIG. 2, assume that as time lapses, a case where the usage state of the CPU resources reaches the predetermined state and a case where the usage state of the memory resources reaches the predetermined state occur, and in response to this, the modules 62 and 63 are migrated to the virtual machines 63 and 64, respectively, as shown in FIG. 8. Thus, the workload of the first virtual machine is transferred to other virtual machines by the method according to the embodiment of the present invention, thereby the workload thereof is reduced.

Additionally, the above method according to the embodiment of the present invention may be applied to each of the virtual machines in the cluster, so as to schedule the execution of the application on each of the virtual machines dynamically. Thus, the workload may be distributed among the respective virtual machines dynamically, so that an equalization of the workload may be realized.

Figure 9:
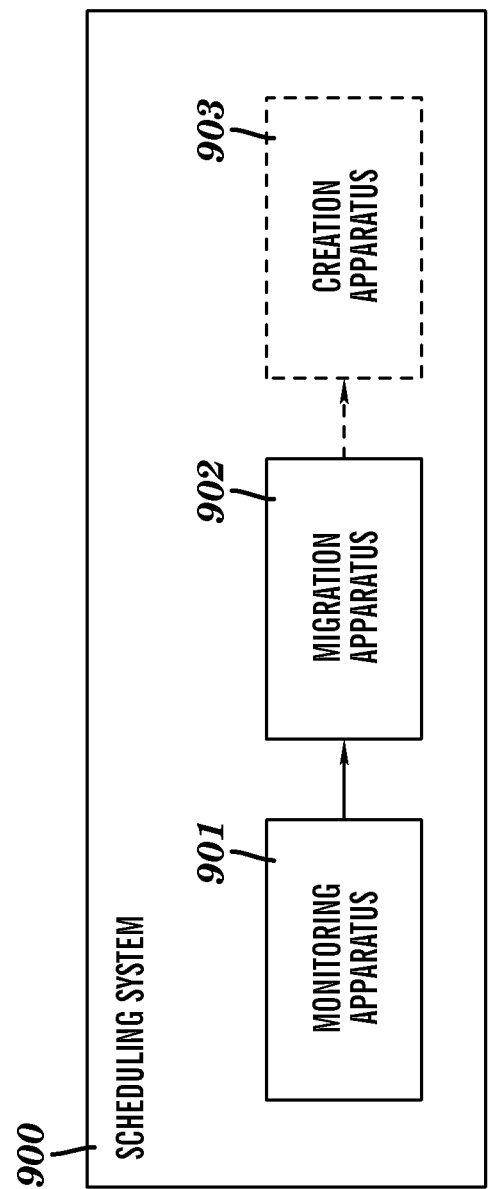
FIG. 9 is a block diagram illustrating a system for scheduling execution of an application including a plurality of modules according to an embodiment of the present invention.

A system for scheduling execution of an application including a plurality of modules according to an embodiment of the present invention will be described below with reference to FIG. 9. The system may perform the method described above, and may be used in the environment shown in FIG. 2. To avoid repetition, descriptions which are the same as those given above are omitted below. As shown in FIG. 9, the system 900 for scheduling execution of an application comprises a monitor apparatus 901 and a migration apparatus 902. In some embodiments, the system 900 may further comprise a creation apparatus 903 as described later. The monitoring apparatus 901 monitors a usage state of resources of a first virtual machine executing the application, so as to determine whether the usage state reaches a predetermined state.

In the example shown in FIG. 2, the first virtual machine may be the virtual machine 51. As described above, a state where the resources are consumed significantly or are going to be exhausted may be used as the predetermined state, therefore the monitoring apparatus 901 may monitor the usage state of the resources of the virtual machine 51 so as to determine whether the resources are consumed significantly or are going to be exhausted. Of course the predetermined state is not limited to the state where the resources are consumed significantly or are going to be exhausted, and may be any other state selected depending on design requirements. The usage state of the resources may be represented by its utilization rate, and in this case, the predetermined state is a state where the utilization rate of the resources exceeds a utilization rate threshold. The utilization rate threshold may be set flexibly depending on actual requirements. Besides the utilization rate, the usage state of the resources may be represented by other indexes (for example, a usage amount, etc).

The monitoring apparatus 901 may monitor all resources or one or more of the all resources of the first virtual machine, and determine whether a usage state of any one of the resources reaches the predetermined state. The monitoring apparatus 901 may utilize program components, which are provided in existing operating systems and can be used to monitor usage states of various resources in a computer (virtual machine), to perform the monitoring operation. The migration apparatus 902 migrates a module consuming the resources in the application to a second virtual machine having corresponding resources, in response to the usage state reaching the predetermined state. Particularly, the migration apparatus 902 may find the module consuming the resources in the application as the module to be migrated, in response to the usage state of the resources reaching the predetermined state. Since at least one of the respective modules of the application executed on the first virtual machine may be configured with the above resource label in advance, the migration apparatus 902 may find the module having the resource label indicating the resources from the respective modules, as the module to be migrated. It is to be noted that, when there are a plurality of modules consuming the resources in the application, the migration apparatus 902 may use a part or all of these modules as the modules to be migrated, or use one of these modules (for example, the module which consumes the resources most) as the module to be migrated. Then, the migration apparatus 902 may migrate the found module to the second virtual machine having the corresponding resources. As described above, the second virtual machine having the corresponding resources may be a virtual machine having the most corresponding resources, which is selected from the plurality of virtual machines, or may be a virtual machine having the corresponding resources, which is newly generated in response to the usage state of the resources reaching the predetermined state. The method used by the migration apparatus 902 to determine the second virtual machine and migrate the module is same as that described above with respect to FIG. 3, and a detailed description thereof is omitted herein.

By performing the migrating operation in the above manner, the system 900 may convert a stand-alone application originally executed on one virtual machine into distributed applications executed on different virtual machines. As described above, after the above migrating operation is performed, communication among the respective modules distributed on the first and the second virtual machines should be maintained so as to ensure that the modules can run normally. The communication between the remaining modules of the application executed on the first virtual machine and the modules migrated to the second virtual machine may be maintained in many manners. In an implementation, the migration apparatus 902 may inform the respective modules on the first virtual machine of address information of the modules migrated to the second virtual machine after the migrating operation is completed, so that the respective modules on the first virtual machine may find the modules on the second virtual machine according to the address information and communicate with them; on the other hand, the migration apparatus 902 may add address information of the respective modules on the first virtual machine into the configuration files of the modules migrated to the second virtual machine, so that the modules migrated to the second virtual machine may find the respective modules on the first virtual machine according to the address information and communicate with them. In another implementation, the creation apparatus 903 may be provided in the system 900. The creation apparatus 903 may create a first communication module and a second communication module on the first virtual machine and the second virtual machine, respectively, so that the modules of the application executed on the first virtual machine and the modules migrated to the second virtual machine may communicate with each other through the first communication module and the second communication module. The creation apparatus 903 may use existing module creation tools to create the communication modules, and a detailed description thereof is omitted herein. The first communication module and the second communication module may operate in the manner described above, so that the respective modules of the application executed on the first virtual machine and the modules migrated to the second virtual machine may communicate seamlessly in a manner used before migration, without necessity of knowing changes in the architecture caused by the migrating operation. Thus, even if the modules of the application executed on the first virtual machine are migrated to the second virtual machine, normal execution of these modules would not be affected. In this implementation, the system 900 does not need to modify codes of the respective modules in the application, and thus has a wider application scope.

During the execution of the application on the first virtual machine, the monitoring apparatus 901 may monitor the usage states of various resources of the first virtual machine continuously, and inform the migration apparatus 902 to perform the above migrating operation when necessary, so that the execution of the application is scheduled dynamically. Thus, with the method according to the embodiment of the present invention, the workload of the first virtual machine is transferred to other virtual machines dynamically, which reduces the workload of the first virtual machine. Additionally, the system 900 may perform the above operations on each of the virtual machines in the cluster, so as to schedule execution of an application on each of the virtual machines dynamically, thereby equalize workloads of the respective virtual machines dynamically. In this way, a throughput of the cluster may be improved and its performance may be optimized. The method and system for scheduling execution of an application including a plurality of modules according to the embodiments of the present invention have been described above in the context of OSGi application. It is to be appreciated that this is only illustrative, not limitative. In fact, besides the OSGi application, the method and system according to the embodiments of the present invention may be applied to other types of applications running in a modular (module) manner.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for scheduling execution of an application, the method comprising steps of:
monitoring resource usage of plurality of application modules executing within the application, wherein the resource usage indicates one or more types of resources the plurality of application modules are consuming;
determining a resource label for each of the plurality of application modules, wherein the resource label comprises an application module name, a description of the application module which indicates a resource from the one or more types of resources that is mainly consumed, and a consumption index for the one or more types of resources;
monitoring a first virtual machine from plurality of virtual machines that executes the application comprising the plurality of application modules to determine if the resource usage by any of the plurality of application modules reaches a predetermined state, wherein if two or more application modules reach the predetermined state, an application module with the most resource usage and with the description of the application module indicating the resource as the mainly consumed resource is selected for migration;
selecting a second virtual machine, from the plurality of virtual machines, that has the indicated resource available, wherein the second virtual machine is selected using the description of the selected application module;
migrating the selected application module to a second application of the selected second virtual machine from the plurality of virtual machines, wherein the application and the second application are related applications; and
creating a first communication module and a second communication module on the application of the first virtual machine and the second application of the second virtual machine, respectively, so that the plurality of modules, including the migrated modules executing within the application and the second application utilizes the first and second communication modules to communicate.

2. The method of claim 1, wherein the usage of the resources is represented by a utilization rate thereof, and the predetermined state is a state that indicates the utilization rate of the resources exceeds a utilization rate threshold.

3. The method of claim 1, wherein the second virtual machine having the indicated resources available is a virtual machine having the most indicated resources available, which is selected from a plurality of virtual machines.

4. The method of claim 1, wherein the second virtual machine having the indicated resources available is a virtual machine having the indicated resources available, which is generated in response to the an event that the resource usage by any of the plurality of application modules reaches a predetermined state.

5. A computer system for scheduling execution of an application, the computer system comprising:
one or more processors, one or more computer-readable memories, one or more computer-readable tangible storage devices and program instructions which are stored on at least one of the one or more storage devices for execution by at least one of the one or more processors via at least one of the one or more memories, the program instructions comprising steps of:
monitoring resource usage of plurality of application modules executing within the application, wherein the resource usage indicates one or more types of resources the plurality of application modules are consuming;
determining a resource label for each of the plurality of application modules, wherein the resource label comprises an application module name, a description of the application module which indicates a resource from the one or more types of resources that is mainly consumed, and a consumption index for the one or more types of resources;
monitoring a first virtual machine from plurality of virtual machines that executes the application comprising the plurality of application modules to determine if the resource usage by any of the plurality of application modules reaches a predetermined state, wherein if two or more application modules reach the predetermined state, an application module with the most resource usage and with the description of the application module indicating the resource as the mainly consumed resource is selected for migration;
selecting a second virtual machine, from the plurality of virtual machines, that has the indicated resource available, wherein the second virtual machine is selected using the description of the selected application module;
migrating the selected application module to a second application of the selected second virtual machine from the plurality of virtual machines, wherein the application and the second application are related applications; and
creating a first communication module and a second communication module on the application of the first virtual machine and the second application of the second virtual machine, respectively, so that the plurality of modules, including the migrated modules executing within the application and the second application utilizes the first and second communication modules to communicate.

6. The computer system of claim 5, wherein the usage of the resources is represented by a utilization rate thereof, and the predetermined state is a state that indicates the utilization rate of the resources exceeds a utilization rate threshold.

7. The computer system of claim 5, wherein the second virtual machine having the indicated resources available is a virtual machine having the most indicated resources available, which is selected from a plurality of virtual machines.

8. The computer system of claim 5, wherein the second virtual machine having the indicated resources available is a virtual machine having the indicated resources available, which is generated in response to the an event that the resource usage by any of the plurality of application modules reaches a predetermined state.

9. A computer program product for scheduling execution of an application, the computer program product comprising:
one or more computer-readable tangible non-transitory storage devices and program instructions stored on at least one of the one or more storage devices, the program instructions comprising steps of:
monitoring resource usage of plurality of application modules executing within the application, wherein the resource usage indicates one or more types of resources the plurality of application modules are consuming;
determining a resource label for each of the plurality of application modules, wherein the resource label comprises an application module name, a description of the application module which indicates a resource from the one or more types of resources that is mainly consumed, and a consumption index for the one or more types of resources;
monitoring a first virtual machine from plurality of virtual machines that executes the application comprising the plurality of application modules to determine if the resource usage by any of the plurality of application modules reaches a predetermined state, wherein if two or more application modules reach the predetermined state, an application module with the most resource usage and with the description of the application module indicating the resource as the mainly consumed resource is selected for migration;
selecting a second virtual machine, from the plurality of virtual machines, that has the indicated resource available, wherein the second virtual machine is selected using the description of the selected application module;
migrating the selected application module to a second application of the selected second virtual machine from the plurality of virtual machines, wherein the application and the second application are related applications; and
creating a first communication module and a second communication module on the application of the first virtual machine and the second application of the second virtual machine, respectively, so that the plurality of modules, including the migrated modules executing within the application and the second application utilizes the first and second communication modules to communicate.

10. The computer program product of claim 9, wherein the usage of the resources is represented by a utilization rate thereof, and the predetermined state is a state that indicates the utilization rate of the resources exceeds a utilization rate threshold.

11. The computer program product of claim 9, wherein the second virtual machine having the indicated resources available is a virtual machine having the most indicated resources available, which is selected from a plurality of virtual machines.

12. The computer program product of claim 9, wherein the second virtual machine having the indicated resources available is a virtual machine having the indicated resources available, which is generated in response to the an event that the resource usage by any of the plurality of application modules reaches a predetermined state.

* * * * *